Nov. 3, 1931.  C. S. BRAGG ET AL  1,830,636
POWER ACTUATOR
Filed April 16, 1925  3 Sheets-Sheet 1
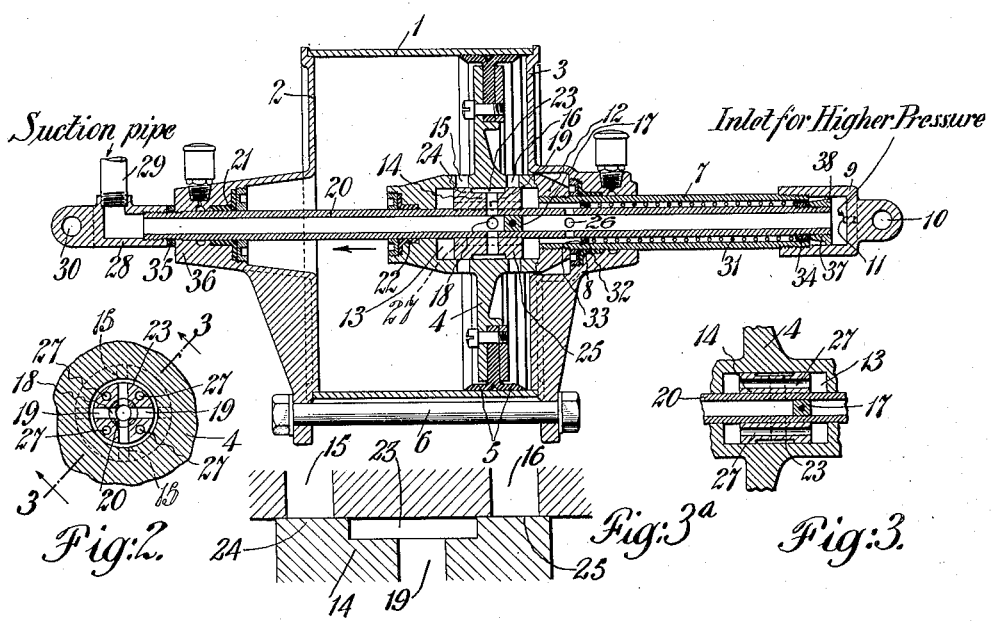
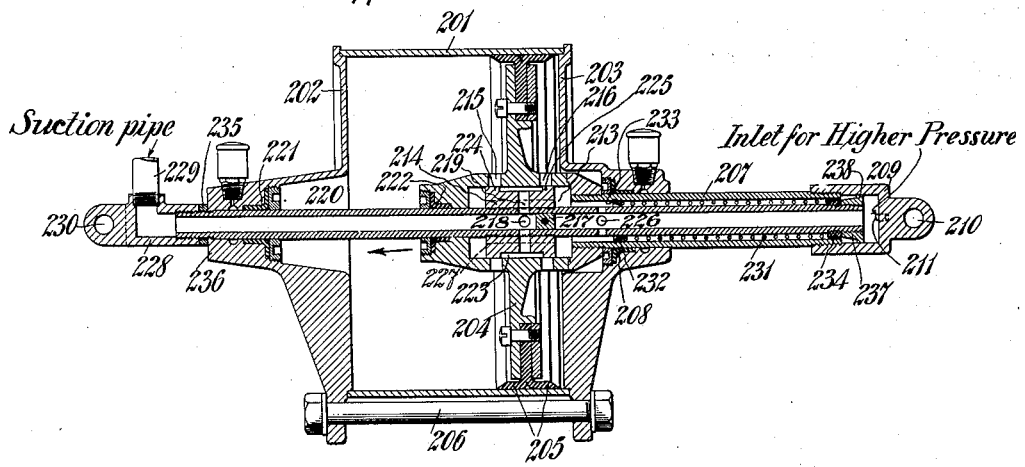
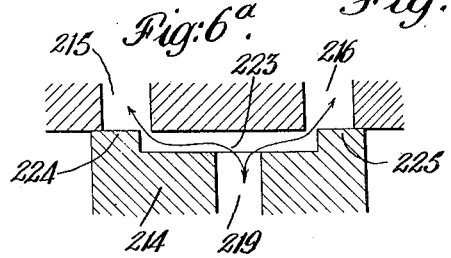

Nov. 3, 1931.  C. S. BRAGG ET AL  1,830,636
POWER ACTUATOR
Filed April 16, 1925.  3 Sheets-Sheet 2

Nov. 3, 1931.  C. S. BRAGG ET AL  1,830,636
POWER ACTUATOR
Filed April 16, 1925   3 Sheets-Sheet 3
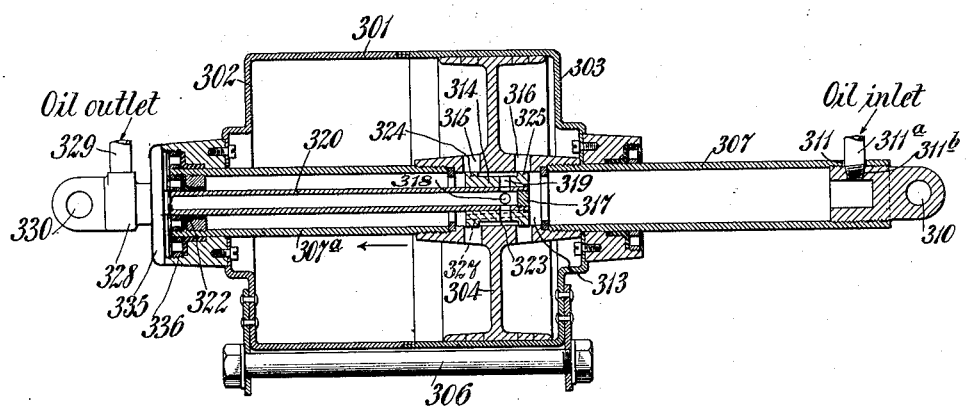
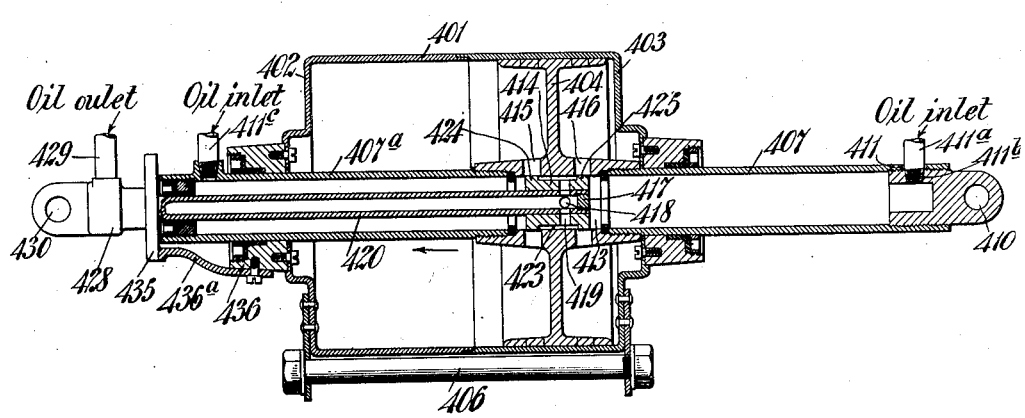
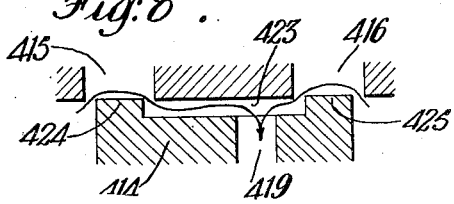

Patented Nov. 3, 1931

1,830,636

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed April 16, 1925. Serial No. 23,459.

Our invention consists in the novel features hereinafter described, reference being had to the accompanying drawings which show several embodiments in which we have contemplated embodying our invention, selected by us for purposes of illustration, and the said invention is fully disclosed in the following description and claims.

Our invention is an improvement in power actuators adapted to be operated by differential pressures under the control of suitable valve mechanism, and our actuator is especially adapted to installations where an extremely easy action of the valve mechanism is important. In carrying out our invention, therefore, we prefer to employ a valve of the piston type which requires no springs to hold it in position. Such valves are subject to the disadvantage that, unless very carefully made, which greatly increases the cost of the mechanism, they will usually leak somewhat when in the neutral position. We have found, however, that in many instances an actuator constructed in accordance with our present invention is entirely practicable, notwithstanding the possibility that there may be some slight leakage. In the accompanying drawings we have illustrated several forms in which we have contemplated embodying our invention, for use in operating brake mechanism and other mechanisms in automotive vehicles of various kinds, and for operating control mechanism for aeroplanes and the like, and our invention consists in the novel features of construction and combination hereinafter described and particularly pointed out in the claims.

Referring to the drawings,

Fig. 1 is a sectional view of a power actuator embodying our invention and adapted for use in connection with brake mechanism and the like.

Fig. 2 is a transverse section through the piston hub and valve mechanism.

Fig. 3 is a longitudinal sectional view of the same.

Fig. 3a is an enlarged detail view illustrating the neutral and normal position of the valve with respect to the piston ports in the form of actuator illustrated in Figs. 1, 2 and 3.

Fig. 6 is a sectional view of a power actuator similar to that illustrated in Figs. 1, 2 and 3, but showing a slightly modified form of valve mechanism, by means of which a condition of rarefication is maintained on both sides of the piston when the parts are in the off or neutral position, and in which the lower pressure outlet is connected to a source of suction, this form of the valve mechanism permitting the piston to be moved without opening the pressure ports.

Fig. 6a is a view similar to Fig. 3a showing the neutral and normal position of the valve with respect to the piston ports in the construction illustrated in Fig. 6.

Fig. 7 is a slightly modified form of actuator adapted for use in connection with a circulating pressure liquid, permitting the free circulation of fluid pressure around the valve in the neutral position.

Fig. 8 is a view similar to Fig. 7, showing a slightly modified form.

Fig. 8a is a view similar to Figs. 3a and 6a, illustrating the relation of the valve when in neutral or normal position of the piston ports in the form of actuator illustrated in Figs. 7 and 8.

Figure 9:
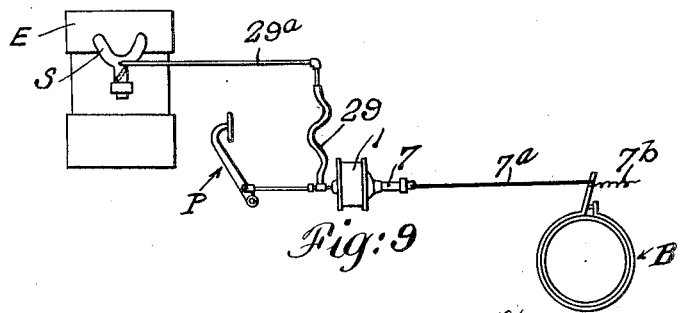

Fig. 9 is a diagrammatic view of the present invention adapted for use in a braking system.

Referring to Figs. 1, 2, 3 and 3a, 1, represents the cylinder of our improved power actuator, closed at both ends by the heads, 2 and 3, and provided with a piston, 4, having oppositely disposed gaskets, 5, the heads of the cylinder being clamped in position by suitable bolts, 6. The hub of the piston is provided with a piston rod, 7, which projects through a stuffing box, 8, in the head, 3, of the cylinder, and is provided at its outer end with means for attaching it to the part to be actuated, which may be the brake mechanism, the clutch mechanism, or other part which it is desired to move, of an automotive vehicle, or aircraft. We prefer to provide the outer end of the piston rod, 7, with a fitting, 9, provided with an attaching lug, or lugs, 10, and the fitting is in this instance provided with an inlet aperture, indicated at 11, which we term the higher pressure inlet. The piston hub, indicated at 12, is provided internally with a valve chamber, 13, of cylindrical form, to receive a piston valve, indicated at 14. The piston hub is provided with ports, 15 and 16 respectively, for connecting the valve chamber, 13 with the cylinder on opposite sides of the piston. The valve, 14, is mounted on a valve sleeve, 20, which extends through a stuffing box, 21, in the head, 2, of the cylinder, and through a stuffing box, 22, in the adjacent end of the piston hub, and said sleeve extends also through the valve chamber, 13, the piston valve, 14, and preferably through the hollow piston rod, 7, and is rigidly secured to the piston valve, 14. The valve sleeve, 20, is provided internally, with a plug or partition, indicated at 17, which divides its interior space into two compartments, one of which, (at the left in Fig. 1) communicates by ports, 18, and registering passages, 19, formed in the valve, 14, with an annular recess, 23, formed in the interior surface of the valve, which we term the suction or outlet chamber. The valve is provided with cylindrical portions, 24 and 25, on opposite sides of the annular recess, 23, said cylinder portions, when the parts are in their normal or off positions, close the ports, 15 and 16, and completely shuts off any communication between the suction chamber, 23, and the interior of the cylinder. The other portion of the valve sleeve (at the right in Fig. 1 of the partition, 17) is in communication with the interior of the hollow piston and fitting, 9, and is therefore in communication with the atmosphere through the higher pressure inlet, 11, and said portion of the valve sleeve, 20, is provided with a port, or ports, 26, communicating with the adjacent end of the valve chamber, 13, by means of the annular space between the sleeve and the interior of the piston rod. The valve, 14, is also provided with one or more longitudinal passages, indicated at 27, four being shown herein, for the purpose of establishing communication between the opposite ends of the valve chamber, 13, on opposite sides of the piston valve, 14. The valve sleeve, 20, is provided outside of the cylinder with means for connecting it with an operator operated part, and also with means for connecting the interior with a source of suction. In this instance we have shown the sleeve, 20, provided with a fitting, 28, provided with means for attaching the suction pipe, 29, thereto, communicating with the interior of the sleeve, and said fitting is also provided with an attaching lug, or lugs, 30, for connecting the sleeve with an operator operated part, which may be the ordinary brake pedal lever, or other suitable device. The suction pipe, 29, is connected to a source of suction, and the higher pressure inlet aperture, 11, is connected to a source of higher pressure. In ordinary installations we prefer to connect the suction pipe, 29, with the intake manifold of the internal combustion engine, used for propelling the vehicle, and to connect the aperture, 11, with the atmosphere, but it is obvious that the aperture, 11, could be connected with a source of pressure, and the pipe, 29, could be connected either with the atmosphere or with the intake manifold, as preferred, the purpose in either case being to create differential pressures on opposite faces of the piston to produce the movement thereof in one direction or the other. It is not necessary with this type of valve mechanism to employ springs for seating the valve. It is desirable, however, where the actuator is employed for the operation of the brake mechanism of an automotive vehicle to employ a retracting spring for effecting the reversing movement of the valve and the return of the pedal lever and valve sleeve to the normal or off position with the piston when the pedal is released and the brakes relieved. This spring can be applied in the usual manner to the pedal lever, but we prefer to interpose it between the piston and the valve sleeve in order that the pressure exerted by the operator in overcoming this retracting spring may not be lost, but may be transmitted through the spring to the piston and assist in moving it in a direction to apply the brakes. In Fig. 1, for example, we have shown a coil spring, indicated at 31, located between the valve sleeve and the hollow piston rod, 7, and engaging a collar, 32, secured to the piston rod in any desired manner, as by a spring ring, 33, the other end of the spring engaging a collar, 34, screwed on a threaded portion of the valve sleeve, 20. When the piston is in the off or normal position, the hub, 12, thereof will engage the head, 3, of the cylinder, 1, as indicated in Fig. 1, and the valve sleeve, 20, will be arrested by the engagement of an adjustable collar, 35, on the sleeve, with the end of the boss, 36, of the cylinder head, 2, in which the stuffing box, 21, is located, as shown in Fig. 1. When the parts are in this position the valve will be held in such position that both of the ports, 15 and 16, are closed. There is a limited amount of lost motion between the valve sleeve, and the piston, so that if the valve sleeve is moved in either direction, so as to take up this lost motion, the piston may be actuated by the sleeve. The lost motion may be limited by the valve itself, but we prefer to avoid placing this strain on the valve, and therefore have shown, in this instance, the sleeve, 20, extended beyond the end of the hollow piston rod 7, and provided with a nut, 37, having a flange, 38, adapted to engage the end of the piston rod when the sleeve is moved to the left in Fig. 1. It follows from this construction that when the brake mechanism has been actuated to the fullest extent, the operator can, by further moving the pedal or other manually operated device so as to take up the lost motion between the sleeve and piston, bringing the flange, 38, into engagement with the piston rod, and add his physical force to the power of the actuator in the application of the brakes, and in the same manner he may in case of the failure of power for any reason, apply force to the operator operated part to move the sleeve, 20, in the direction of the arrow in Fig. 1, thereby placing the valves in proper position to vent the cylinder, taking up the lost motion between the piston and the valve actuating sleeve, and positively moving the piston forward to apply the brakes. Obviously when the brake pedal is released, the retracting spring will force the valve sleeve in the opposite direction, and vent the cylinder for the return movement of the piston, which would be effected by the load of the brakes and the retracting mechanism thereof where the device is used in connection with brake mechanisms. In other connections, the piston can likewise be forced rearwardly by the operator operated part, the collar, 37, engaging the rear end of the fitting, 9, when the valve sleeve is moved in a direction opposite that of the arrow in Fig. 1, far enough to take up lost motion.

The parts being in the position shown in Fig. 1, and the pipe, 29, being connected with the intake manifold of the internal combustion engine, for example, if the valve sleeve is moved forward in the direction of the arrow, the valve, 14, will be shifted in the chamber, 13, so as to place the ports, 15, in communication with the outlet or suction chamber, 23, and the ports, 16, in communication with the passages leading to the atmosphere, thereby exhausting the air forward of the piston and permitting atmospheric air to enter the cylinder in rear of the piston and moved the piston forward. As soon as the forward movement of the valve sleeve is stopped, the piston will continue to move forward until the ports, 15 and 16, are closed or nearly closed, being arrested in such position, as to hold the load of the brake mechanism. A further forward movement of the valve actuating sleeve, 20, will be followed by a similar movement of the piston. When the valve sleeve is permitted to move rearwardly under the action of its retracting spring, 31, as when the operator removes his foot from the brake pedal, the valve, 14, will be shifted so as to place the ports, 16, in communication with the vacuum chamber, and place the ports, 15, in communication with the forward side of the valve chamber, which communicates through the by pass, 27, with the rear portion of the valve chamber, which latter is in communication with the atmosphere, as before described, thereby quickly restoring the piston to normal or off position and releasing the brakes, the piston coming to rest against the head, 3, and just before it stops, the valve sleeve will be arrested by the stop collar, 35, coming in contact with the boss, 36, on head, 2, thus returning the valve to the normal position shown in Fig. 1. It will be understood that the spring, 31, may be omitted altogether if it is desired, and the movements of the valve actuating sleeve in both directions may be effected manually. This form of valve mechanism makes the actuator extremely simple and cheap to construct and the operation of the valve mechanism is extremely easy, especially where no retracting spring is employed, as the only resistance to the movements of the valves with respect to the piston, is the slight friction between the cylindrical portions of the valve and the corresponding inner face of the valve chamber.

In Fig. 9, there is disclosed a braking installation for use on automotive vehicles or aircraft, embodying the construction shown in Figs. 1–3 and hereinbefore described in detail. As shown, such installation employs the suction pressure in the intake manifold S of an internal combustion engine E, the said manifold being connected by conduits 29ª and 29 to the low pressure side of the power actuator 1. The valve actuating sleeve, 20, Fig. 1, is preferably connected at one end to a pedal mechanism P and at the other to a suitable brake mechanism B through interconnecting members 7 and 7ª. The brake mechanism may, if desired, include the usual return spring 7ᵇ for assisting the return of the parts to normal position after a braking operation.

Figure 4:
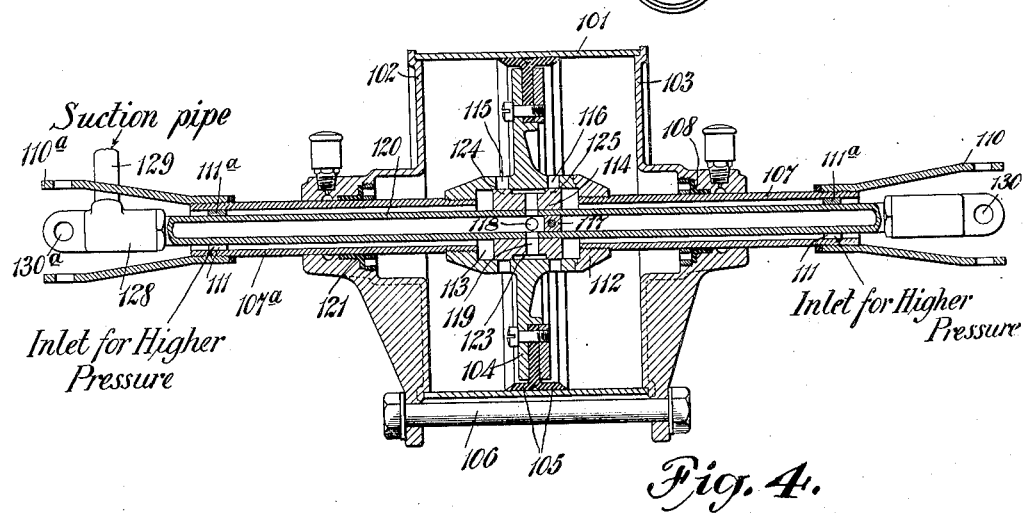
Fig. 4 is a sectional view of a slightly modified form of power actuator adapted for use in connection with aviation control mechanism.
Figure 5:
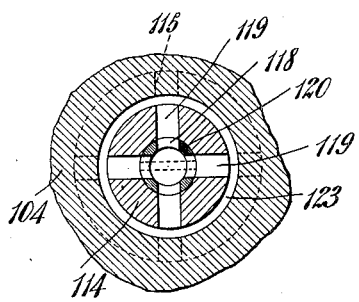
Fig. 5 is a transverse sectional view through the piston hub and valve mechanism shown in Fig. 4.

In Figs. 4 and 5 we have shown a slight modification of our invention designed especially for aviation control, but which may be used for any other purpose for which it may be found desirable, as for steering motor boats, or any other purpose for which it is found to be desirable. In this form of the invention in which similar parts to those previously described are given the same numerals, with the addition of 100, 101 represents the cylinder, provided with heads, 102 and 103. The piston, 104, is provided with two hollow piston rods, 107 and 107ª, extending through a stuffing box on the opposite end of the cylinder, the valve actuating sleeve, 120, extending entirely through both the hollow piston rods and through the hubs of the piston, where it is provided with a piston reversing valve, 114, provided with the cylindrical portions, 124 and 125, for controlling the cylinder ports, 115 and 116. In this instance the valve is provided with an annular suction or outlet chamber, 123, and each end of the valve chamber, 113, is independently connected with the atmosphere by the annular passage between the sleeve and the piston rod, and a suitable air inlet opening, in this instance indicated at 111, and formed in the guiding collars, 111ª, is interposed between the valve sleeve and the respective piston rods. The valve, 114, is provided with ports, 119, communicating with the suction pipe, 129, but it is unnecessary to provide the valve with the by pass for connecting the opposite ends of the valve chamber in view of the fact that each end of the chamber is connected with the atmosphere, as before described. In aviation controls, it is customary to employ a flexible cable, passing around sheaves and having its ends connected with the control stick, or bar, in a well known way, and in applying the form of actuator indicated in Fig. 4 to the type of aviation control, the ends of the cable control are connected to the respective piston rods, 107 and 107ª, which are in this instance shown as provided with yokes, 110 and 110ª, for the purpose. A similar cable is connected with the stick or other manually operated device, and the opposite ends are connected to the sleeve, which is provided at each end with lugs, 130 and 130ª for the purpose, so that a movement of the stick in either direction will effect a movement of the valve sleeve in the corresponding direction, and will be immediately followed by a corresponding movement of the piston and the actuation of the part or parts controlled thereby. In an actuator designed for this purpose, obviously it is unnecessary to employ a retracting spring, and it is also unnecessary to provide a by-pass from one end of the valve chamber to the other, as both ends of the valve chamber are open to the atmosphere. It will be understood that the suction pipe, 129, which is connected with the valve actuating sleeve, 120, is connected with a suitable source of suction, which may be the intake manifold of the internal combustion engine, or the suction may be obtained in any other usual or preferred manner. In like manner it is to be understood that the annular space or passage between the hollow piston rod and the valve actuating sleeve, which is here shown connected with the atmosphere, may be connected with a source of pressure fluid, if desired, by suitable pipe connections to the piston rods, 107 and 107ª, for example, in which instance the ends of the piston rods would be provided with suitable stuffing boxes.

(The details of the construction shown in Figs. 4 and 5, with the exception of the valve mechanism itself, are not specifically claimed herein, as they form the subject matter of a divisional application filed by us November 13, 1926, and given Serial No. 148,156.)

In Fig. 6 we have shown a slight modification of our invention in which provision is made for maintaining the condition of rarefication within the cylinder on both sides of the piston when the piston is in the off or normal position. In this instance the several parts which correspond with those illustrated in Fig. 1, are given the same numerals with the addition of 200, and the construction is exactly the same as that illustrated in Fig. 1, except for this important difference, that the cylindrical surfaces, 224, and 225, are so constructed and arranged that when the parts are in the normal or off position, the piston being arrested by coming into contact with the head, 203, and the valve sleeve being arrested by the collar, 235, engaging the boss, 236, on the head, 202, the valve, 214, will be held in the position indicated in Fig. 6, both of the ports, 215, and 216 leading from the suction chamber, 223, to the cylinder on opposite sides of the piston, will be slightly opened. It follows from this construction that the entire cylinder is in effect constituted a vacuum storage tank or equalizing tank. When the valve actuating sleeve is moved in the direction of the arrow, Fig. 6, for instance, to apply the brakes, the forward movement of the valve will cut off communication between the ports, 216 and outlet or suction chamber, 223, and connect it with the atmosphere, while the ports, 215, will be fully connected with the suction chamber, thereby effecting the forward movement of the piston to apply the brakes without delivering any material quantity of air to the intake manifold or other source of suction. When the movement of the valve sleeve is reversed, the first effect will be to connect both ports, 215 and 216, with each other and with the suction chamber, 223, thereby producing an equalization of pressures on opposite sides of the piston, and also the exhausting of any air admitted in rear of the piston permitting the applied brakes to release themselves. The further reverse movement of the valve will connect the port, 216, with the suction chamber, and the port, 215, with the atmosphere, through the by-pass, 227, in the valve, and cause the parts to be returned to normal position when the sleeve, 220, will be arrested before the piston comes to rest and the valve will be returned to normal position as the piston comes to rest, in which position both ports, 215 and 216, are connected with each other and with the outlet or suction chamber 223, again permitting an equalization of pressures on opposite sides of the piston and the withdrawal of air admitted forward of the piston, for the purpose of retracting the same. As in the case of the construction shown in Fig. 1, the piston can be positively actuated by the valve sleeve, as hereinbefore set forth, and for the same purposes. (The construction illustrated in Figs. 6 and 6a is not specifically claimed herein, as it forms the subject matter of a divisional application filed by us November 13, 1926, and given Serial No. 148,157, Patent 1,824,032, Sept. 22, 1931.)

Our improved actuator can also be employed in connection with a continuously circulating liquid, as oil for example, circulated by a suitable pump, in the manner shown and described in our former application for Letters Patent of the United States, Serial No. 15,460, filed March 14, 1925, Patent 1,604,545, October 26, 1926. One form of apparatus constructed for use in this manner, is illustrated in Fig. 7, in which the corresponding parts are given the same numerals as in Fig. 1, with the addition of 300. In this figure, the piston, 304, is provided with two hollow piston rods, 307 and 307$^a$, extending through suitable stuffing boxes in the heads of the cylinders, which in this instance is shown as a forging or stamping, formed in two parts, and held in operative relation by the bolts, 306. The piston reversing valve, 314, is located in a central valve chamber, 313, in the piston, and secured to the valve actuating sleeve, 320, which extends through a stuffing box, 322, in the outer end of the piston rod, 307$^a$. The valve, 314, is provided with cylindrical portions, 324, 325, so disposed with relation to the ports, 315 and 316, that when the parts are in neutral or in normal or off position, both of said ports will be open and not only communicate with the outlet or suction chamber, 323, which in turn communicates with the interior of the sleeve, 320, by the passage, 319, but said ports will communicate with the interior of the hollow pistons, 307 and 307$^a$, both of which communicate with the higher pressure inlet. Therefore the high and low pressure sources are directly connected. The valve sleeve in this instance is closed on its inner end by a plug, 317, and the exterior portion of the valve actuating sleeve, 320, is provided with the usual fitting, 328, connected with the suction pipe, 329, of the circulating oil system, and having the ears, 330, connected to the operator operated part. The piston rod, 307, preferably constructed so that it may pass into the hub or var, 336, of the cylinder head, 302, and the sleeve 320, is provided with a stop collar, 335, adjustably mounted thereon, for engaging the end of the boss, 336, to limit and determine the position of the valve when the parts are in the normal or off position. The piston rod, 307, is provided with an aperture, 311, to which is connected the inlet or pressure pipe, 311$^a$, of the circulating oil system, and the piston rod is preferably provided with an attaching ear or lug, 310, in this instance formed as a plug, screwed into the end of the same and provided with an aperture, 311$^b$, registering with the aperture, 311, in the piston rod.

Assuming that the cylinder is filled with oil on both sides of the piston, and that the piston rods, valve sleeve, oil inlet, and oil eduction pipes are likewise filled with oil, which is being continuously circulated by the pump, and the parts being in the normal position illustrated in Fig. 7, for example, the oil will pass through the piston rod, 307, and be by-passed around the cylindrical portion, 325, of the valve to the outlet or suction chamber, 323, thence out through the valve sleeve, 320, and suction pipe, 329, thus permitting a free circulation of the oil. If the valve sleeve, 320, is moved in the direction of the arrow in Fig. 7, the valve, 314, will be correspondingly moved so as to cut off the ports, 316, from the suction chamber, 323, and bringing the suction chamber more fully into communication with the ports, 315. The incoming oil will thence pass through the ports, 316, and accummulate pressure behind the piston while the oil in the cylinder forward of the piston will be withdrawn by the suction of the pump through the ports, 315, outlet or suction chamber, 323, sleeve, 320, and outlet or suction pipe, 329. This will cause the piston to move in the direction of the arrow and the movement will continue as long as the movement of the valve actuating sleeve continues. When the valve sleeve stops the movement of the piston will continue with respect to the valve and bring the valves into such a position as to maintain sufficient pressure behind the piston to balance the load of the brakes, or other actuated part. When the valve sleeve, 320, is moved in a direction opposite that indicated by the arrow, the outlet or suction chamber, 323, of the valve will be placed in communication with the ports, 316, thereby withdrawing oil in rear of the piston and the incoming oil from the pipe, 311$^a$, will pass through the by-pass or passage, 327, of the valve to the forward side of the valve, and thence through ports, 315, to the cylinder forward of the piston and effect a return movement of the piston and the release of the brakes. Just before the piston comes to rest with its hub against the head, 303, of the cylinder, the stop collar, 335, on sleeve, 320, will engage the boss, 336, on the cylinder head, 302, thus arresting the sleeve and valve but permitting the piston to move with respect to the valve, sufficiently to restore the valve to the normal position indicated in Fig. 7, and thus by passing the oil around the cylindrical portion, 325, of the valve, and out through the suction pipe, 329, to the pump, as previously described.

In Fig. 8 we have illustrated a slight modification of the construction illustrated in Fig. 7, in which the operation is precisely the same as that described with reference to Fig.

7, except that the by-pass passage, or passages, 327, of Fig. 7, in the valve, are omitted and the oil is admitted at both ends of the valve chamber through the respective piston rods. In Fig. 8, the parts corresponding to those previously described with respect to Fig. 1 are given the same numerals with the addition of 400, and as to those parts which are identical with those shown in Fig. 7, they need not be again described. In this instance the piston rod, 407, is provided with oil inlet pipe, 411$^a$, and the piston rod, 407$^a$, is provided with a branch oil inlet pipe, indicated at 411$^c$, so that oil is supplied to either end of the valve chamber, 413, as required by the position of the valve, 414. The oil is withdrawn through the outlet or suction chamber, 423, of the valve, and through the valve actuating sleeve, 420, and outlet or suction pipe, 429. As the presence of the oil inlet pipe, 411$^c$, prevents the possibility of the piston rod, 407$^a$, passing into the hub of the head, 402, so as to permit the stop collar, 435, on the sleeve to engage said hub, 436, the hub, 436, is provided with a bracket, 436$^a$, to engage the stop collar, 435, on the sleeve, 420, to arrest the sleeve on the return movement of the parts to normal or retracted position, so that the valve will be held in neutral position and permit the by-passing of the oil around the cylindrical portions, 424 and 425, of the valve from the inlet pipes, 411$^c$, and 411$^a$, through the valve chamber, 413, to the outlet or suction chamber, 423. After the piston has been actuated, in the manner previously described with reference to Fig. 7, and it is desired to return the piston to its normal or off position, the reversed movement of the valve sleeve, 420, will move the valve so as to bring the suction chamber, 423, into communication with the ports, 416, and at the same time to bring the ports, 415, in communication with the forward end of the valve chamber, 413, thus withdrawing the oil from the cylinder in rear of the piston, and permitting the oil under pressure from the pump to enter through the pipe, 411$^c$, and be delivered to the cylinder forward of the piston to effect the rearward movement of the piston. The operation otherwise is exactly as previously described, and the valve sleeve will be arrested by the bracket, 436$^a$, and stop collar, 435, so that the piston comes to rest with its hub against the head, 403, of the cylinder, the valve will be in the position shown in Fig. 8, and permitting the by-passing of the oil through the apparatus without effecting any operation thereof.

Where the actuator is operated by a continually circulating pressure liquid, we prefer to employ castor oil, as this is not injurious to the packings which we prefer to make of rubber, as hereinbefore stated, but it is obvious that other liquids could be employed and that the packings may be made of other materials than rubber, if this should be or become necessary.

The constructions illustrated in Figs. 7, 8, and 8$a$, are not specifically claimed herein as they form the subject matter of a divisional application filed by us November 13, 1926, and given Serial No. 148,158.

It will also be understood as before indicated, that any of the forms of actuator herein shown can be operated in any of three ways, by providing the necessary connections, that is to say, (1) by suction or rarefication one one side of the piston and air under atmospheric pressure on the other side of the piston, or (2) atmospheric air on one side of the piston and pressure fluid on the other side of the piston, or (3) suction or rarefication on one side of the piston and pressure fluid acting on the other side of the piston.

It will also be noted that we have shown several forms of piston valve mechanism in connection with our actuator which may be identified as follows:—

1. In which, in the normal or neutral position of the valve, the cylindrical valve portions on opposite sides of the outlet or suction chamber, close the ports in the piston hub.

2. In which, in the normal or neutral position of the valve, the cylindrical valve portions of the piston valve on opposite sides of the outlet or suction chamber, permit the piston ports to be partly open on one side of each cylindrical valve portion for the purpose of establishing equalization of pressures on opposite sides of the piston, or a by-pass fluid pressure from one side of the piston to the other and of connecting both sides of the piston with the outlet or suction chamber, as shown, for example, in Fig. 6.

3. In which, in the normal or neutral position of the valve, the cylindrical valve portions on opposite sides of the outlet or suction chamber, are of less width than the piston ports, and in the normal or neutral positions of the valve, leave the said ports open on each side of each of said cylindrical valve portions to permit a pressure fluid to circulate around the same, as shown, for example, in Figs. 7 and 8, and by-pass fluid pressure from one side of the piston to the other.

We have also shown means for admitting higher pressure fluid to the opposite ends of the valve chamber, either by an inlet pipe connected at one end, and operating in connection with longitudinal passages through the valve, or by inlet pipes connected with the valve chamber, at both ends, in which case the longitudinal passages in the valve are omitted.

What we claim and desire to secure by Letters Patent is:—

1. In a servo motor system for automotive vehicles provided with an internal combustion engine for driving the same and producing a source of suction, the combination with a power actuator comprising a cylinder closed at both ends, a double acting piston in said cylinder, a valve chamber in said piston provided with ports connecting the same with the cylinder on both sides of the piston, of a reversing piston valve located in said valve chamber and provided with a central annular outlet or suction chamber and with cylindrical valve portions at opposite ends of the suction chamber arranged to be brought into registration with said ports when the valve is in normal position, means for constantly maintaining opposite ends of said valve chamber in communication with the atmosphere acting to balance the valve in atmosphere, means for constantly maintaining said suction chamber in connection with the source of suction, and an operator operated part for shifting said valve, the movement of said valve in one direction causing a movement of the piston in the same direction.

2. In a power actuator, the combination of a cylinder closed at both ends, a double acting piston in said cylinder provided with a central cylindrical valve chamber and with ports connecting said valve chamber with the cylinder on both sides of the piston, a reversing piston valve located in said valve chamber and provided with a central annular suction chamber, and with cylindrical valve portions at opposite ends of the suction chamber adapted to close said ports when the valve is in normal position, means for constantly maintaining opposite ends of the valve submerged in higher fluid pressure acting to balance the valve in high pressure, means for constantly maintaining said suction chamber in connection with the source of suction, means acting to normally retract said piston, means for arresting the piston in retracted position, independent means coordinated with said piston arresting means for arresting the valve in position to close said ports, and an operator operated part for shifting the valve against the retracting means, the movement of said valve in one direction causing a movement of the piston in the same direction.

3. In a power actuator, the combination of a cylinder closed at both ends, a double acting piston in said cylinder provided with a cylindrical valve chamber, and with ports connecting said valve chamber with the end portions of the cylinder on both sides of the piston, a reversing piston valve in said valve chamber, provided with cylindrical valve portions adapted to bridge and close the ports when in normal position and having a suction chamber intermediate said cylindrical valve portions adapted to be brought into registration with the ports for one or other of the end portions of the cylinder, means for connecting the piston with the parts to be actuated, a valve sleeve extending through one end of the cylinder, and connected with said valve for operating the same, the interior of said sleeve being in communication with the said suction chamber of the reversing valve, said sleeve being provided with means for connecting it to an operator operated part, means for connecting the interior of said sleeve with a source of suction, means for admitting higher pressure fluid to the end portions of the valve chamber, a retracting spring interposed between the valve actuating sleeve and piston, means for arresting the piston in a retracted position, and independent means coordinated with said piston arresting means for arresting the sleeve with the said reversing piston valve in a position to close said ports.

4. In a servo motor system for automotive vehicles provided with an internal combustion engine for driving the same and producing a source of suction, the combination with a power actuator comprising a cylinder closed at both ends, a double acting piston in said cylinder provided with a cylindrical valve chamber having ports leading to opposite sides of the piston, a reversing piston valve slidably mounted in said valve chamber provided with spaced cylindrical valve portions adapted to be brought into registration with said ports and having an annular suction chamber intermediate said cylindrical valve portions adapted to be brought into registration with the ports on either side of the piston, a hollow piston rod connected to the piston and extending through one of the closed ends of the cylinder and open to the atmosphere, said piston rod having its interior communicating with the valve chamber, ports extending through said valve whereby a higher pressure fluid has access at all times to opposite ends of the valve chamber and acts to hold said valve balanced in atmosphere, independent radial ports extending through the valve into the suction chamber, a hollow valve sleeve extending through the opposite closed end of the cylinder and into the piston rod communicating with said radial ports, and connected to operate said valve, said sleeve connecting said suction chamber to the source of suction, and a retracting spring interposed between said valve sleeve and the piston rod.

In testimony whereof we affix our signatures.

CALEB S. BRAGG.
VICTOR W. KLIESRATH.